United States Patent
Sicre

(10) Patent No.: US 11,806,938 B2
(45) Date of Patent: Nov. 7, 2023

(54) ADDITIVE MANUFACTURING METHOD USING A FOCUSED ENERGY SOURCE, SAID METHOD BEING REGULATED ACCORDING TO THE INTENSITY OF A CONTROL CURRENT OF SAID FOCUSED ENERGY SOURCE

(71) Applicant: Airbus Operations SAS, Toulouse (FR)

(72) Inventor: Matthieu Sicre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/863,495

(22) Filed: Jul. 13, 2022

(65) Prior Publication Data
US 2023/0013374 A1    Jan. 19, 2023

(30) Foreign Application Priority Data
Jul. 15, 2021 (FR) ...................................... 2107633

(51) Int. Cl.
| | | |
|---|---|---|
| *B33Y 10/00* | (2015.01) | |
| *B29C 64/393* | (2017.01) | |
| *B33Y 50/02* | (2015.01) | |
| *B29C 64/141* | (2017.01) | |

(52) U.S. Cl.
CPC .......... *B29C 64/393* (2017.08); *B29C 64/141* (2017.08); *B33Y 10/00* (2014.12); *B33Y 50/02* (2014.12)

(58) Field of Classification Search
None
See application file for complete search history.

(56) References Cited

U.S. PATENT DOCUMENTS

2017/0239892 A1* 8/2017 Buller ..................... B29C 64/40
2021/0138551 A1* 5/2021 Martin .................... B33Y 50/02

FOREIGN PATENT DOCUMENTS

| GB | 2452774 A | 3/2009 |
|---|---|---|
| WO | 2020245633 A1 | 12/2020 |

OTHER PUBLICATIONS

Jackson O'Connell, All3dp, Thermal Runaway (3D Printer)—Simply Explained, Jul. 26, 2020 (Year: 2020).*
French Search Report; priority document.

* cited by examiner

*Primary Examiner* — Yung-Sheng M Tsui
(74) *Attorney, Agent, or Firm* — Greer, Burns & Crain, Ltd.

(57) ABSTRACT

A method for manufacturing a component by stacking layers of material that are each obtained by depositing and melting, continuously, a material by virtue of an energy beam of which at least one feature is controlled by a control current intensity. The manufacturing method includes a step of monitoring the control current intensity, a step of comparing the monitored control current intensity with a given threshold and a step of stopping the manufacturing method when the control current intensity is above the given threshold. This momentary stopping of the method makes it possible to significantly reduce the risks of energy runaway liable to destroy the deposited material bead and the neighboring structure.

9 Claims, 1 Drawing Sheet

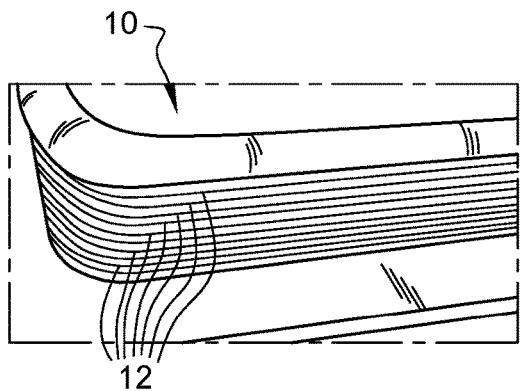
Fig. 1
Prior Art
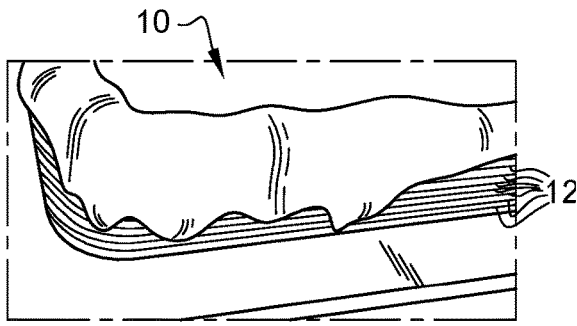
Fig. 2
Prior Art
Fig. 3
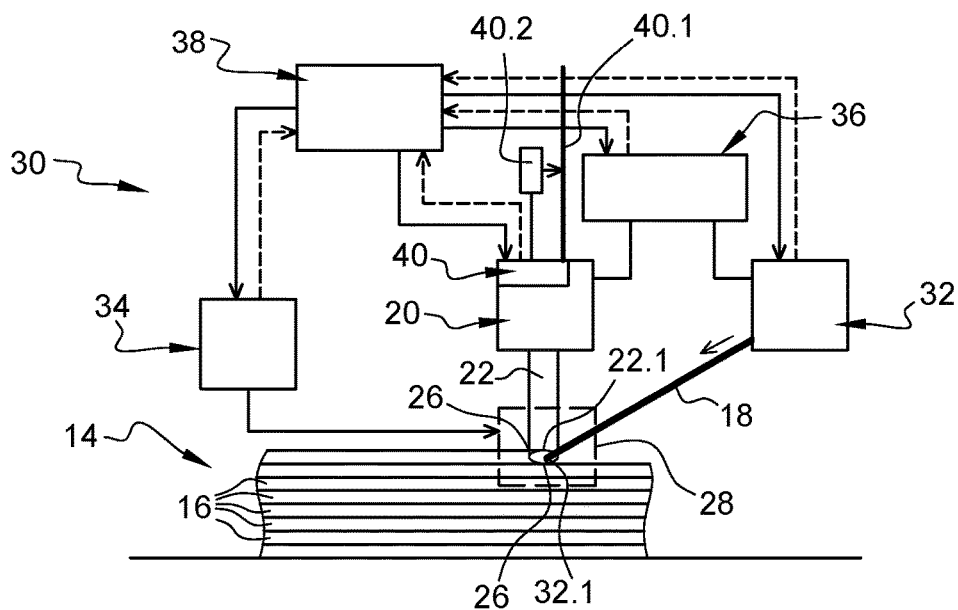
Fig. 4
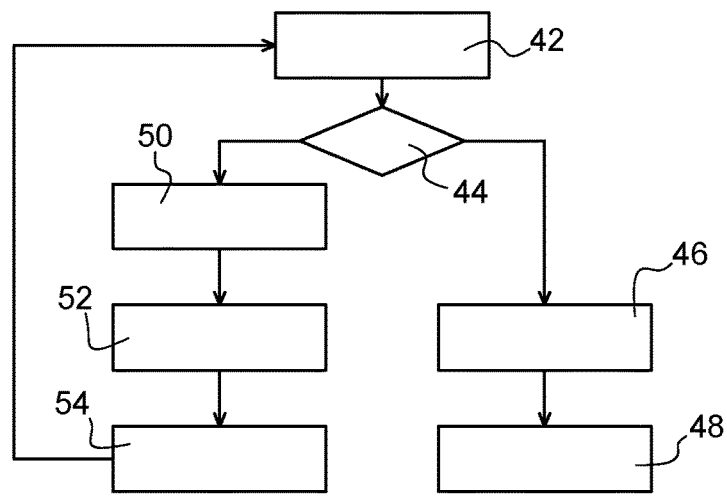

ADDITIVE MANUFACTURING METHOD USING A FOCUSED ENERGY SOURCE, SAID METHOD BEING REGULATED ACCORDING TO THE INTENSITY OF A CONTROL CURRENT OF SAID FOCUSED ENERGY SOURCE

CROSS-REFERENCES TO RELATED APPLICATIONS

This application claims the benefit of the French patent application No. 2107633 filed on Jul. 15, 2021, the entire disclosures of which are incorporated herein by way of reference.

FIELD OF THE INVENTION

The present application relates to an additive manufacturing method using a focused energy source, said method being regulated according to the intensity of a control current of said focused energy source. More particularly, the invention relates to an additive manufacturing method involving directed energy deposition (DED).

BACKGROUND OF THE INVENTION

In the field of aeronautics, certain titanium components, such as a primary structure of a pylon of a jet engine, are produced by assembling a plurality of complex parts machined from blocks of material. This manufacturing technique is relatively lengthy and generates a great deal of material loss in the form of titanium chips that cannot be reused.

In order to reduce the amount of waste, additive manufacturing methods make it possible to produce components by stacking layers of material on top of one another.

According to an embodiment illustrated in FIG. 1, a component 10 is produced by stacking layers of material 12 obtained by melting a material using a focused energy source, such as a laser beam, an electron beam, for example. According to a technique known as a technique involving directed energy deposition, the material in powder or wire form is deposited at the same time as the energy provision.

According to one mode of operation, a titanium wire is unwound as the focused energy source advances so as to obtain a superposition of beads of material.

During tests for manufacturing titanium components involving directed energy deposition, a particular phenomenon of energy runaway, also called flash, occurs in a random and uncontrolled manner, causing the destruction of the titanium bead that has just been deposited and the neighboring structure, as illustrated in FIG. 2.

Although the levels of energy per unit area used are of the order of 500 J/mm$^2$ to obtain a regular bead, the levels of energy per unit area are between 3000 J/mm$^2$ and 8000 J/mm$^2$ at the moment of energy runaway, and this leads to the destruction of the titanium bead and the neighboring structure and to the scrapping of the component.

Since this energy runaway remains a phenomenon that is difficult to control, this additive manufacturing technique involving directed energy deposition cannot be implemented in methods for manufacturing components in series.

The present invention seeks to remedy all or some of the drawbacks of the prior art.

SUMMARY OF THE INVENTION

To this end, the invention relates to a method for manufacturing a component by stacking layers of material that are each obtained by depositing and melting, continuously, a material in an impact zone targeted by an energy beam, the material coming from a material supply system configured to occupy an activated state in which the material supply system supplies the impact zone with material and a deactivated state in which the material supply system no longer supplies the impact zone with material, the energy beam being emitted by a focused energy source configured to occupy an activated state in which the focused energy source generates the energy beam and a deactivated state in which it does not generate the energy beam, the energy beam having at least one feature controlled by a control current intensity.

According to the invention, the manufacturing method comprises a step of monitoring the control current intensity, a step of comparing the monitored control current intensity with a given threshold and a step of stopping the manufacturing method when the control current intensity is above the given threshold.

This momentary stopping of the manufacturing method when the control current intensity exceeds a given threshold makes it possible to significantly reduce the risks of energy runaway.

According to another feature, the manufacturing method comprises a step of resuming the manufacturing method when the measured control current intensity falls back below the given threshold.

According to another feature, during the resumption step, the focused energy source is switched to the activated state.

According to another feature, during the resumption step, the material supply system is switched to the activated state.

According to another feature, if the monitored control current intensity is above the given threshold, the manufacturing method comprises a step of deactivating the focused energy source during which the focused energy source is switched to the deactivated state, the focused energy source and the component being immobilized with respect to one another, and a step of deactivating the material supply system during which the material supply system is switched to the deactivated state, the material supply system and the component being immobilized with respect to one another.

According to another feature, the steps of deactivating the focused energy source and the material supply system are carried out simultaneously.

According to another feature, the step of monitoring the control current intensity is carried out continuously.

According to another feature, the given threshold is dependent on an operating intensity that corresponds to the control current intensity used during the manufacturing method without energy runaway.

According to another feature, the given threshold is equal to the operating intensity increased by a percentage corresponding to the operating intensity divided by 10.

BRIEF DESCRIPTION OF THE DRAWINGS

Other features and advantages will become apparent from the following description of the invention, which description is given solely by way of example, with reference to the appended drawings in which:

FIG. 1 is a depiction of part of a component obtained via an additive manufacturing method involving directed energy deposition without energy runaway, FIG. 2 is a depiction of part of a component obtained via an additive manufacturing method involving directed energy deposition with energy runaway, FIG. 3 is a schematic depiction illustrating a manufacturing device for implementing an additive manufacturing method involving directed energy deposition, and FIG. 4 is a diagram illustrating an additive manufacturing method involving directed energy deposition illustrating an embodiment of the invention.

DETAILED DESCRIPTION OF THE PREFERRED EMBODIMENTS

As illustrated in FIG. 3, an additive manufacturing method involving directed energy deposition makes it possible to obtain a component 14 by stacking layers of material 16 that are obtained by continuously depositing a material 18 and melting it by virtue of a focused energy source 20.

According to one mode of operation, the focused energy source 20 generates an energy beam 22 having an impact point 22.1 in an impact zone 24 that is situated on a substrate 26 and at which the material 18 is provided in the form of at least one wire or a powder. Generally, the impact zone 24 is situated in a controlled atmosphere 28 having at least one controlled feature from among the gaseous composition, the kinematics of the gases, the pressure, or the temperature, for example.

The substrate 26 can be a support independent of the component 14 to be produced or a layer of material 16 of the component 14 that has already been deposited.

The energy beam 22 can be a laser beam, an electron beam, a plasma beam or the like.

According to one configuration, the layers of material 16 are beads of material.

A manufacturing device 30 for implementing the manufacturing method comprises, in addition to the focused energy source 20, a material supply system 32 configured to supply, at a supply point 32.1, the impact zone 24 with material 18, an atmosphere management system 34 configured to manage at least one feature of the controlled atmosphere 28, at least one movement system 36 configured to move the substrate 26, the focused energy source 20 and/or the material supply system 32 and a control system 38 configured to control the focused energy source 20, the material supply system 32, the atmosphere management system 34 and each movement system 36.

The focused energy source 20 comprises a control 40 making it possible to control at least one feature of the energy beam 22. According to one embodiment, the control 40 is configured to control a control current having an intensity that makes it possible to control at least one feature of the energy beam 22.

In the case of a focused energy source 20, the control current corresponds to the electric supply current 40.1 of the focused energy source 20. According to one embodiment, the control 40 comprises an apparatus 40.2 for measuring the intensity of the electric supply current 40.1.

The focused energy source 20 is configured to occupy an activated state in which it generates the energy beam 22 and a deactivated state in which it does not generate the energy beam 22.

The material supply system 32 is configured to occupy an activated state in which it supplies the impact zone 24 with material 18 and a deactivated state in which it no longer supplies the impact zone 24 with material 18.

The atmosphere management system 34 is configured to occupy an activated state in which it regulates at least one feature of the controlled atmosphere 28 and a deactivated state in which it does not regulate any feature of the controlled atmosphere 28.

Each movement system 36 is configured to occupy an activated state in which it moves the focused energy source 20 and/or the material supply system 32 and a deactivated state in which the focused energy source 20 and the material supply system 32 are immobile.

According to one embodiment, the material 18 may be titanium or Inconel®. It is in the form of a wire. Of course, the invention is not limited to this embodiment for the material 18.

According to one configuration, the manufacturing device 30 comprises a single movement system 36 supporting the focused energy source 20 and the material supply system 32. According to another configuration, the manufacturing device 30 comprises a first movement system supporting the focused energy source 20 and a second movement system supporting the material supply system 32. According to another configuration, the manufacturing device 30 comprises a movement system configured to move the substrate 26.

During the manufacturing method, a large number of parameters have to be controlled and commanded so that the layer of material 16 that is deposited has at least one expected feature. The expected features comprise in particular dimensional features, mechanical features, and health features of the material.

Certain controlled and commanded parameters relate to the focused energy source 20, the energy beam 22 and the movement system 36 supporting the focused energy source 20. By way of indication, the parameters relating to the focused energy source 20, the energy beam 22 and the movement system 36 supporting the focused energy beam 20 are the activated/deactivated state of the focused energy source 20, the position of the impact point 22.1 of the energy beam 22, the speed of movement of the impact point 22.1 of the energy beam 22, the power, energy, frequency and/or pulse of the energy beam 22 and the size of the impact point 22.1. This list of parameters relating to the focused energy source 20, the energy beam 22 and the movement system 36 supporting the focused energy source 20 is not exhaustive.

Certain controlled and commanded parameters relate to the material 18, the material supply system 32 and the movement system 36 supporting the material supply system 32. By way of indication, the parameters relating to the material 18, the material supply system 32 and the movement system 36 supporting the material supply system 32 are the nature and the properties of the material 18 used, the activated/deactivated state of the material supply system 32, the position of the supply point 32.1 and the speed of movement of the supply point 32.1. This list of the parameters relating to the material 18, the material supply system 32 and the movement system 36 supporting the material supply system 32 is not exhaustive.

Certain other controlled and commanded parameters relate to the atmosphere management system 34.

According to one embodiment, the manufacturing device 30 comprises a plurality of sensors configured to measure or determine values of certain features relating to the focused energy source 20, its control 40, the energy beam 22, the impact zone 24, the controlled atmosphere 28, the material supply system 32, the atmosphere management system 34, the movement system(s) 36, the measured or determined values being transmitted to the control system 38.

According to one mode of operation, the control system 38 comprises at least one control law making it possible, from these measured or determined values, to control or command the focused energy source 20, the energy beam 22, the material supply system 32, the atmosphere management system 34, the movement system(s) 36.

Generally, the control system 38 comprises a plurality of control laws.

In operation, the level of energy per unit area at the impact zone 24 is less than 3000 J/mm$^2$ Generally, this level of energy per unit area is between 40 J/mm$^2$ and 3000 J/mm$^2$.

If the level of energy per unit area remains below a given threshold, the layer of material 16 is correctly formed and has the expected features.

In a random and unexplained manner, energy runaway during which the energy per unit area is markedly greater than 3000 J/mm$^2$ and can reach values close to 8000 J/mm$^2$ can occur and disrupt the formation of the material layer 16 that then no longer has the expected features.

During energy runaway, certain controlled and commanded parameters diverge and become out of control. Given the large number of parameters and their interactions, it is very difficult to determine which has a major role in this energy runaway phenomenon and what corrective measure has to be implemented.

According to one feature of the invention, the parameter that is controlled to prevent a runaway phenomenon is the intensity of the control current of the focused energy source 20, which has to remain below a given threshold. The corrective measure for preventing the energy runaway phenomenon is the stopping of the method for as long as the intensity of the control current of the focused energy source 20 is above the given threshold. The manufacturing method resumes when the control current intensity falls back below the given threshold.

According to a mode of operation illustrated in FIG. 4, the manufacturing method comprises a step 42 of monitoring the intensity of the control current of the focused energy source 20 and a step 44 of comparing the monitored control current intensity with the given threshold.

This step 42 of monitoring the control current intensity can be carried out regardless of the activated or deactivated state of the focused energy source 20, the material supply system 32 and/or the movement system(s) 36.

If the monitored control current intensity is below the given threshold, the manufacturing method comprises a step 46 of continuation until a final step 48 of obtaining the component 14.

If the monitored control current intensity is above the given threshold, the manufacturing method comprises a step 50 of deactivating the focused energy source 20 during which the focused energy source 20 is switched to the deactivated state, the focused energy source 20 and the component 14 being immobilized with respect to one another, and a step 52 of deactivating the material supply system 32 during which the material supply system 32 is switched to the deactivated state, the material supply system 32 and the component 14 being immobilized with respect to one another, then a step 54 of resuming the method when the monitored control current intensity falls back below the given threshold.

According to one embodiment, the steps 50, 52 of deactivating the focused energy source 20 and the material supply system 32 are carried out simultaneously.

During the resumption step 54, the focused energy source 20, the material supply system 32 and each movement system 36 are switched to the activated state.

This momentary stopping of the manufacturing method when the control current intensity exceeds a given threshold makes it possible to significantly reduce the risks of energy runaway.

According to one mode of operation, the step of monitoring the control current intensity is carried out continuously.

According to another feature, the given threshold is dependent on an operating intensity that corresponds to the control current intensity used during the manufacturing method without energy runaway. According to the manufacturing methods, this operating intensity is for example between 50 and 300 mA.

According to one embodiment, the given threshold is equal to the operating intensity increased by a percentage corresponding to the operating intensity divided by 10.

Thus, for an operating intensity of the order of 50 mA, the threshold is equal to 50+5%, i.e., 52.5 mA. For an operating intensity of the order of 300 mA, the threshold is equal to 300+30%, i.e., 390 mA.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a component involving direct energy deposition by
stacking layers of material that are each obtained by depositing and melting, continuously, a material in an impact zone targeted by an energy beam,
the material coming from a material supply system configured to occupy an activated state in which the material supply system supplies the impact zone with material and a deactivated state in which the material supply system no longer supplies the impact zone with material,
the energy beam being emitted by a focused energy source configured to occupy an activated state in which the focused energy source generates the energy beam and a deactivated state in which it does not generate the energy beam,
the energy beam having at least one feature controlled by an energy beam input current,
wherein the manufacturing method comprises the steps of:
monitoring the energy beam input current,
comparing the monitored energy beam input current with a given threshold current above which energy runaway occurs, and
stopping the manufacturing method when the energy beam input current is above the given threshold current.

2. The manufacturing method as claimed in claim 1, further comprising a step of resuming the manufacturing method when the measured energy beam input current falls back below the given threshold current.

3. The manufacturing method as claimed in claim 2, wherein, during the resumption step, the focused energy source is switched to the activated state.

4. The manufacturing method as claimed in claim 2, wherein, during the resumption step, the material supply system is switched to the activated state.

5. The manufacturing method as claimed in claim 1, wherein, if the monitored energy beam input current is above the given threshold current, the manufacturing method comprises steps of:
- deactivating the focused energy source during which the focused energy source is switched to the deactivated state, the focused energy source and the component being immobilized with respect to one another, and
- deactivating the material supply system during which the material supply system is switched to the deactivated state, the material supply system and the component being immobilized with respect to one another.

6. The manufacturing method as claimed in claim 5, wherein the steps of deactivating the focused energy source and the material supply system are carried out simultaneously.

7. The manufacturing method as claimed in claim 1, wherein the step of monitoring the energy beam input current is carried out continuously.

8. The manufacturing method as claimed in claim 7, wherein the given threshold current is dependent on an operating intensity that corresponds to the energy beam input current used during the manufacturing method without energy runaway.

9. The manufacturing method as claimed in claim 8, wherein the given threshold current is equal to the operating intensity increased by a percentage corresponding to the operating intensity divided by 10.

* * * * *